United States Patent
Rosen et al.

(10) Patent No.: US 9,181,956 B2
(45) Date of Patent: Nov. 10, 2015

(54) SEAL SHAFT FOR CONTROLLING FLUID FLOW WITHIN AN AIR CYCLE MACHINE

(75) Inventors: Seth E. Rosen, Middletown, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1145 days.

(21) Appl. No.: 12/974,251

(22) Filed: Dec. 21, 2010

(65) Prior Publication Data

US 2012/0156031 A1 Jun. 21, 2012

(51) Int. Cl.
*F04D 29/10* (2006.01)
*F16J 15/447* (2006.01)

(52) U.S. Cl.
CPC ........... *F04D 29/102* (2013.01); *F16J 15/4472* (2013.01); *Y10T 29/49323* (2015.01)

(58) Field of Classification Search
CPC ....... F04D 29/08; F04D 29/083; F04D 29/10; F04D 29/102; F04D 29/12; F04D 29/122
USPC ............................................... 415/231, 174.3
See application file for complete search history.

(56) References Cited

U.S. PATENT DOCUMENTS

| 5,025,642 | A |  | 6/1991 | Brunskill et al. |
| 5,113,670 | A |  | 5/1992 | McAuliffe et al. |
| 5,224,842 | A | * | 7/1993 | Dziorny et al. ............... 417/406 |
| 5,249,934 | A |  | 10/1993 | Merritt et al. |
| 5,310,311 | A |  | 5/1994 | Andres et al. |
| 6,058,715 | A |  | 5/2000 | Strang et al. |
| 6,070,418 | A |  | 6/2000 | Crabtree et al. |
| 6,151,909 | A |  | 11/2000 | Carter et al. |
| 7,342,332 | B2 |  | 3/2008 | McAuliffe et al. |
| 2006/0059941 | A1 |  | 3/2006 | Meritt et al. |
| 2006/0248887 | A1 |  | 11/2006 | Arnold |
| 2007/0134105 | A1 |  | 6/2007 | Beers et al. |

* cited by examiner

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

An example seal shaft includes a cylindrical body establishing a bore that extends axially between a first end portion of the body and a second end portion of the body. Apertures are also established in the body. The apertures extend radially between an outer surface of the body and the bore. The seal shaft further includes a first group knife edge seals and a second group of knife edge seals. The first group of knife edge seals have a diameter, and a ratio of the diameter to the total cross-sectional area of the apertures is between 58.79 and 78.77.

20 Claims, 3 Drawing Sheets

SEAL SHAFT FOR CONTROLLING FLUID FLOW WITHIN AN AIR CYCLE MACHINE

BACKGROUND

This disclosure relates to a seal shaft incorporated into an air cycle machine that supplies air to an aircraft cabin.

Known air cycle machines include a turbine rotor driven to rotate a shaft and in turn drive a compressor rotor. The air cycle machine houses the turbine rotor in a turbine section and houses the compressor rotor in the compressor section. Typically, bearings are incorporated into a housing to support the shaft for rotation. One known type of compressor bearing is an air bearing. Seal shafts are often used in air cycle machines, particularly the air cycle machines that utilize air bearings. The seal shafts control the flow of air near rotating interfaces within the air cycle machine.

One type of shaft seal includes radially extending holes that facilitate exhausting surplus air from the air cycle machine. During operation, the compressor section, the turbine section, or both, may generate the surplus air. If the surplus air is not exhausted, the surplus air tends to move between the compressor section and the turbine section, which can make the air cycle machine less efficient. Under some conditions, surplus air still moves between the compressor section and the turbine section, even with the holes. In the past, the shaft seal did not adequately control the flow surplus air flow between the compressor section and the turbine section.

SUMMARY

An example seal shaft includes a cylindrical body establishing a bore that extends axially between a first end portion of the body and a second end portion of the body. Apertures are also established in the body. The apertures extend radially between an outer surface of the body and the bore. The seal shaft further includes a first group knife edge seals and a second group of knife edge seals. The first group of knife edge seals have a diameter, and a ratio of the diameter to the total cross-sectional area of the apertures is between 58.79 and 78.77.

An example air cycle machine for supplying air to an aircraft cabin includes a compressor section having a compressor rotor configured to rotate with a main shaft, and a turbine section having a turbine rotor configured to rotate with the main shaft. A seal shaft is configured to limit flow of fluid between the compressor section and the turbine section. The seal shaft has a cylindrical body establishing a bore extending axially between a first end portion of the body and a second end portion of the body. Apertures are established in the body. The apertures extend radially between an outer surface of the body and the bore. The seal shaft further includes a first group of knife edge seals and a second group of knife edge seals. The first group of knife edge seals have a diameter, and a ratio of the diameter to the total cross-sectional area of the apertures is between 58.79 and 78.77.

An example method of installing a seal shaft in an air cycle machine includes providing a seal shaft configured to limit flow of fluid between a compressor section and a turbine section of an air cycle machine. The seal shaft has a cylindrical body establishing a bore extending axially between a first end portion of the body and a second end portion of the body. Apertures are established in the body. The apertures extend radially between an outer surface of the body and the bore. The seal shaft includes a first group of knife edge seals and a second group of knife edge seals. The first group of knife edge seals have a diameter and a ratio of the diameter to the total cross-sectional area of the apertures is between 58.79 and 78.77. The method positions a portion of a turbine rotor within the bore. The method also positions a portion of a compressor rotor within the bore and a portion of a shaft of the air cycle machine within the bore.

These and other features of the present invention can be best understood from the following specification and drawings, the following of which is a brief description.

DETAILED DESCRIPTION

Figure 1:
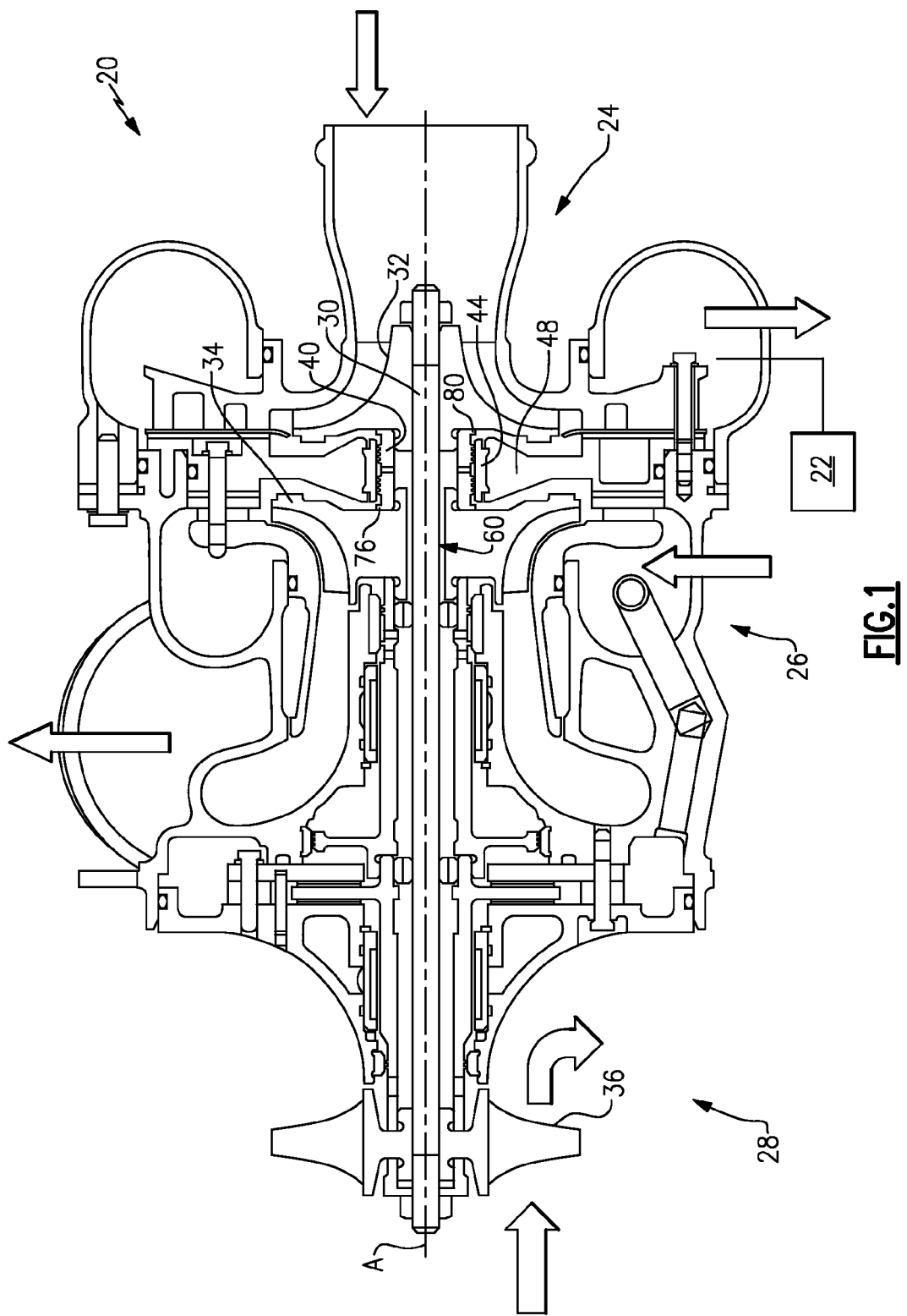
FIG. 1 is a cross-sectional view of an air cycle machine that supplies cabin air.
Figure 2:
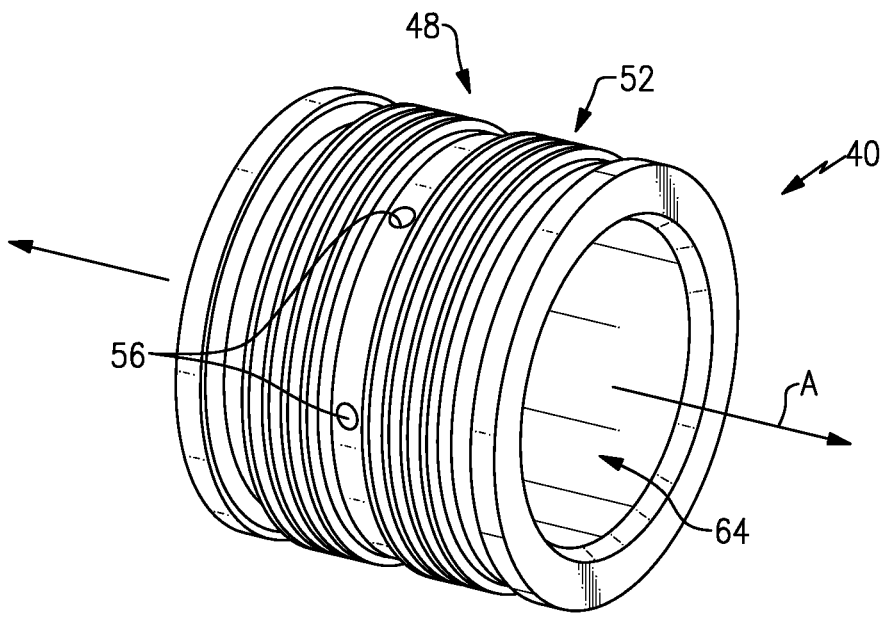
FIG. 2 is a first perspective view of a seal shaft that controls flow in the FIG. 1 air cycle machine.
Figure 3:
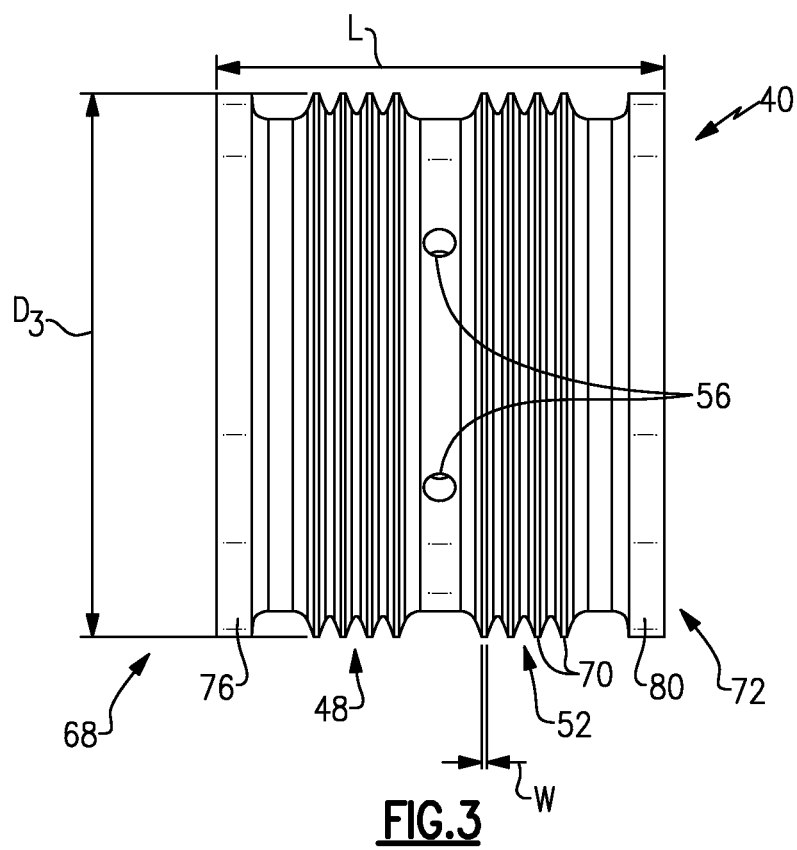
FIG. 3 is a side view of the FIG. 2 seal shaft.
Figure 4:
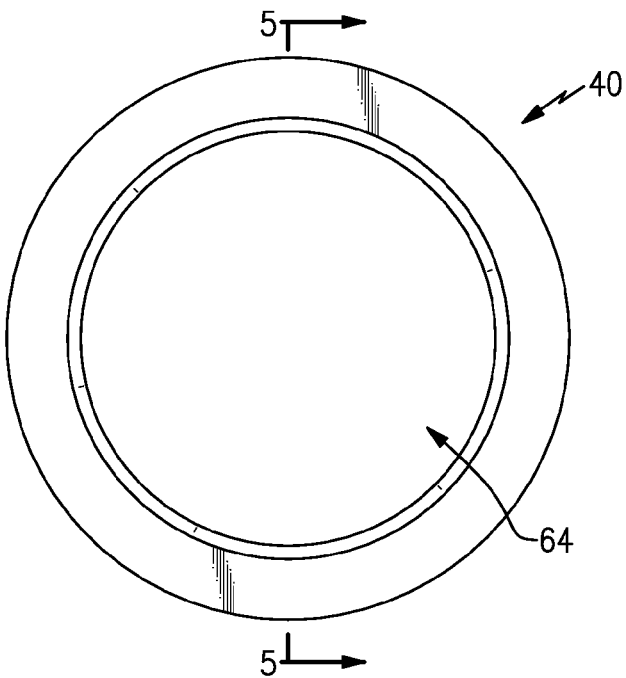
FIG. 4 is an end view of the FIG. 2 seal shaft.
Figure 5:
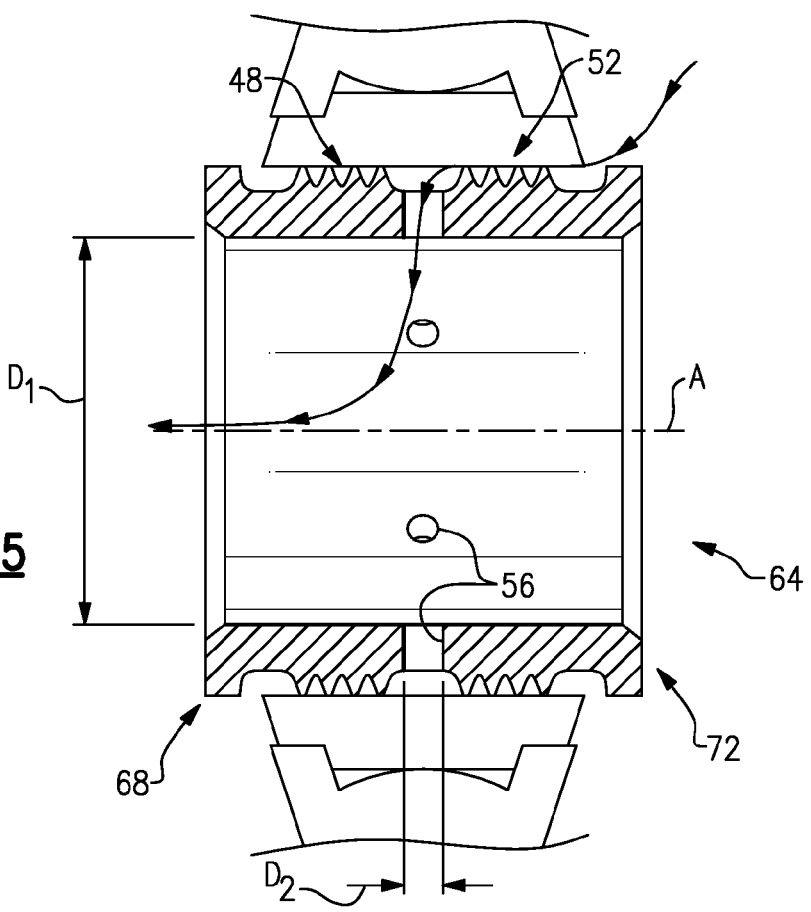
FIG. 5 is a section view at line 5-5 in FIG. 4.

FIG. 1 shows an example air cycle machine 20 ("ACM") that is incorporated into an air supply system 22 of a vehicle, such as an aircraft, helicopter, or land-based vehicle. The ACM 20 includes a compressor section 24, a turbine section 26, and a fan section 28 that are generally disposed about a main shaft 30, such as a tie rod. The compressor section 24 includes a compressor rotor 32, the turbine section 26 includes a turbine rotor 34, and the fan section 28 includes a fan rotor 36. The compressor rotor 32, turbine rotor 34, and fan rotor 36 are secured on the main shaft 30 for co-rotation about an axis A.

Referring to FIGS. 2-5 with continuing reference to FIG. 1, an example seal shaft 40 is radially spaced from, but rotates with, the main shaft 30. During rotation, the seal shaft 40 may interface with a seal land 44 disposed on a seal plate 48. The seal shaft 40 includes a first group of knife edge seals 48 and a second group of knife edge seals 52 that are each configured to contact the seal land 44 during rotation of the main shaft 30. Interfacing with the seal land 44 may include contacting the seal land 44 with the knife edge seals 48 and 52. Contact between the knife edge seals 48 and 52 and the seal land 44 limits movement of air between the turbine section 26 and the compressor section 24, particularly movement of surplus air in the turbine section 26 to the compressor section 24.

The example seal shaft 40 establishes a plurality of radially extending apertures 56 that are circumferentially distributed evenly about the axis A. The apertures 56 are configured to communicate surplus air away from the turbine section 26, the compressor section 24, or both. In this example, the surplus air is communicated through the apertures 56 to a shaft cavity 60 established radially between the main shaft 30 and the seal shaft 40. The surplus air is the exhausted from the shaft cavity 60. That is, air within the shaft cavity 60 is free to move to the environment surrounding the ACM 20. Providing a path for exhausting the surplus air from the ACM 20 helps avoid movement of surplus air between the turbine section 26 and the compressor section 24.

In this example, the seal shaft 40 establishes a bore 64 extending from a first end portion 68 to a second end portion 72. The bore 64 receives a portion of the turbine rotor 34 and a portion of the compressor rotor 32. The seal shaft 40 and the bore 64 have an axial length L that is between 0.788 and 0.792 inches (20.015 and 20.117 millimeters).

The main shaft 30 extends through the bore 64. The seal shaft 40 rotates with the turbine rotor 34, the compressor rotor 32, and the main shaft 30. The seal shaft 40 rotates relative to the seal land 44. The diameter $D_1$ of the bore 64 is between 0.870 and 0.880 inches (22.098 and 22.352 millimeters) in this example.

The example seal shaft 40 includes six apertures 56, which are positioned near the axial center of the seal shaft 40. The apertures 56 extend radially relative to the bore 64 in this example. Other examples may include more or fewer apertures 56. The circumferential distances between each of the apertures 56 is equal in this example, but in other examples may vary.

The example apertures 56 are cylindrical and have a diameter $D_2$ that is between 0.051 and 0.059 inches (1.295 and 1.499 millimeters). The total cross-sectional area of all of the six apertures 56 is thus from 0.012257 to 0.016404 in$^2$ (0.311 to 0.417 mm$^2$). The diameter $D_2$ is 0.055 inches (1.397 millimeters) in this example. Thus, in this example, the total cross-sectional area of one of the apertures 56 is about 0.002376 in$^2$ (1.53 mm$^2$), and the total cross-sectional area of all of the apertures 56 is 0.014256 in$^2$ (9.2 mm$^2$). Other examples include larger or smaller apertures 56. The apertures 56 are non-cylindrical in some examples.

In this example, the first group of knife edge seals 48 includes four knife edge seals positioned axially between the first end portion 68 and the apertures 56. The second group of knife edge seals 52 includes four knife edge seals positioned axially between the second end portion 72 and the apertures 56. The knife edge seals 48 and 52 each have a contact face 70, which is the portion of the seals 52 configured to contact the seal land 44.

During operation of the ACM 20, the surplus air may build up in the compressor section 24. The pressure forces the contact faces 70 of the second group of knife edge seals 52 to move away from the seal land 44, which allows the surplus air to pass axially past the second group of knife edge seals 52.

The contact faces 70 of the example knife edge seals 48 and 52 each have an axial width W of .010 inches (.254 millimeters). The diameter $D_3$ of the knife edge seals 48 and 52 is between 0.9645 and 0.9655 (24.498 and 24.524 millimeters). A cross-sectional area bounded by the diameter $D_3$ of the knife edge seals 48 and 52 is thus from 0.730624 to 0.732141 in$^2$ (18.558 to 18.596 mm$^2$). The knife edge seals 48 and 52 are sized to maintain relatively tight clearances with the seal land 44 during rotation unless there is significant build-up of surplus air. That is, the seal land 44 has a diameter that is slightly larger than the diameter of the $D_3$.

The example seal shaft 40 includes a collar 76 at the first end portion 68 and a collar 80 at the second end portion 72. The collars 76 and 80 extend past opposing axial ends of the seal land 44. The collars 76 and 80 have a diameter that is about the same as the diameter $D_3$ of the knife edge seals 48 and 52 in this example. Other example seal shafts may not include the collars 76 and 80.

Regarding the materials, the example seal shaft 40 is made from a 15-5 stainless steel and the seal land 44 is made from a polyamide. Other examples may include other types of materials.

The seal shaft 40 controls air flow between the compressor section 24, the turbine section 26, and the apertures 56. More specifically, increasing the size of the diameter $D_3$ relative to the diameter of the seal land 44 controls air flow.

In this example, surplus air from the compressor section 24 moves from the compressor section 24 and axially past the second group of knife edge seals 52. The surplus air then flow though the apertures 56 to the shaft cavity 60 where the surplus air is exhausted to the surrounding environment. The clearances between the first group of knife edge seals 48 and the seal land 44 are very tight, which causes the surplus air from the compressor section 24 to tend to move through the apertures 56 rather than into the turbine section 26. As can be appreciated, the surplus air follows the path of least resistance. Similarly, if compressor section 24 is generating surplus air, the second group of knife edge seals 52 resists flows of that surplus air into the turbine section 26.

In this example, the ratio of the diameter $D_3$ of the first group of knife edge seals 48 to the total cross-sectional area of the apertures 56 is between 58.79 and 78.77. Further, in this example, the total cross-section area of the apertures 56 is represented by the total circumferential cross-sectional areas of the six apertures. In this example, the ratio of a cross-sectional area bounded by the diameter $D_3$ of the first group of knife edge seals 48 to the total cross-sectional area of the apertures 56 is from 44.54 to 59.73. Adjusting the total cross-sectional area of the apertures 56 can influence how easily surplus air flows through the apertures 56. Adjusting the diameter $D_3$ can influence how easily surplus air from the compressor section 24 flows to the turbine section 26.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A seal shaft comprising:
    a cylindrical body establishing a bore extending axially between a first end portion of the body and a second end portion of the body;
    a plurality of apertures established in the body, and extending radially between an outer surface of the body and the bore;
    a first group of knife edge seals; and
    a second group of knife edge seals, wherein the first group of knife edge seals have a diameter, and a ratio of the diameter to the total cross-sectional area of the apertures is between 58.79 and 78.77.

2. The shaft seal of claim 1, wherein the plurality of apertures are positioned axially between the first group of knife edge seals and the second group of knife edge seals.

3. The seal shaft of claim 1, wherein the plurality of apertures comprises six apertures circumferentially distributed about the axis.

4. The seal shaft of claim 3, wherein the six apertures are equally spaced about a circumference of the cylindrical body.

5. The seal shaft of claim 3, wherein the six apertures each have the same cross-sectional area.

6. The seal shaft of claim 1, wherein the first group of knife edge seals each have an axial width, and a ratio of the axial width to the total cross-sectional area of the apertures is between .3658 and 1.1422.

7. The seal shaft of claim 1, wherein the cylindrical body has an axial length and the first group of knife edge seals have a diameter, and a ratio of the axial length to the diameter is between 48.04 and 64.62.

8. The seal shaft of claim 1, wherein the first group of knife edge seals includes four knife edge seals.

9. The seal shaft of claim 6, wherein the second group of knife edge seals includes four knife edge seals and have the same diameter of the first group of knife edge seals.

10. The seal shaft of claim 1, wherein both the first group of knife edge seals and the second group of knife edge seals include radially extending knife edge seals.

11. A method of installing a seal shaft in an air cycle machine comprising the steps of:

(a) providing a seal shaft configured to limit flow of fluid between a compressor section and a turbine section of an air cycle machine, the seal shaft having a cylindrical body establishing a bore extending axially between a first end portion of the body and a second end portion of the body, the seal shaft further including a plurality of apertures established in the body and extending radially between an outer surface of the body and the bore, a first group of knife edge seals, and a second group of knife edge seals, wherein the first group of knife edge seals have a diameter, and a ratio of the diameter to the total cross-sectional area of the apertures is between 58.79 and 78.77;
(b) positioning a portion of a turbine rotor within the bore;
(c) positioning a portion of a compressor rotor within the bore; and
(d) positioning a portion of a shaft of the air cycle machine within the bore.

12. The method of claim 11, wherein the plurality of apertures are positioned axially between the first group of at least three knife edge seals and the second group of at least three knife edge seals.

13. An air cycle machine for supplying air to an aircraft cabin comprising:
a compressor section having a compressor rotor configured to rotate with a main shaft;
a turbine section having a turbine rotor configured to rotate with the main shaft; and
a seal shaft configured to limit flow of fluid between the compressor section and the turbine section, the seal shaft having
a cylindrical body establishing a bore extending axially between a first end portion of the body and a second end portion of the body,
a plurality of apertures established in the body, and extending radially between an outer surface of the body and the bore,
a first group of knife edge seals, and
a second group of knife edge seals, wherein the first group of knife edge seals have a diameter, and a ratio of a cross-sectional area bounded by the diameter to the total cross-sectional area of the apertures is between 44.54 and 59.73.

14. The air cycle machine of claim 13, wherein the plurality of apertures are positioned axially between the first group of knife edge seals and the second group of knife edge seals.

15. The air cycle machine of claim 13, wherein the plurality of apertures comprises six apertures circumferentially distributed about the axis.

16. The air cycle machine of claim 15, wherein the six apertures are equally spaced about a circumference of the cylindrical body.

17. The air cycle machine of claim 13, wherein the first group of knife edge seals and the second group of knife edge seals each include four knife edge seals.

18. The air cycle machine of claim 13, wherein the first group of knife edge seals and the second group of knife edge seals are configured to contact a seal land.

19. The shaft seal of claim 1, wherein a ratio of a cross-sectional area bounded by the diameter to the total cross-sectional area of the apertures is between 44.54 and 59.73.

20. The method of claim 11, wherein a ratio of a cross-sectional area bounded by the diameter to the total cross-sectional area of the apertures is between 44.54 and 59.73.

* * * * *